United States Patent
Itoh

[11] Patent Number: 5,874,987
[45] Date of Patent: *Feb. 23, 1999

[54] METHOD FOR RECORDING STEREOSCOPIC IMAGES AND DEVICE FOR THE SAME

[75] Inventor: Kazuki Itoh, 11-1, Shimonogou, Ueda City, Nagano Prefecture, 386-12, Japan

[73] Assignees: Shinmei Electric Co., Ltd.; Kazuki Itoh, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 766,348

[22] Filed: Dec. 16, 1996

[30] Foreign Application Priority Data

Feb. 14, 1996 [JP] Japan .................................. 8-049642

[51] Int. Cl.⁶ .................................................. H04N 15/00
[52] U.S. Cl. ................................................ 348/49; 348/51
[58] Field of Search .................................. 348/39, 49, 42, 348/47, 53, 51, 54, 335; H04N 13/00

[56] References Cited

U.S. PATENT DOCUMENTS

| | | | |
|---|---|---|---|
| 3,531,191 | 9/1970 | Bernier | 348/47 |
| 4,523,226 | 6/1985 | Lipton et al. | 348/49 |
| 4,568,970 | 2/1986 | Rockstead | 348/49 |
| 4,751,570 | 6/1988 | Robinson | 348/47 |
| 4,943,860 | 7/1990 | Hattori | 348/49 |
| 5,003,385 | 3/1991 | Sudo | 348/47 |
| 5,130,794 | 7/1992 | Ritchey | 348/39 |
| 5,430,474 | 7/1995 | Hines | 348/51 |
| 5,543,816 | 8/1996 | Heacock | 348/53 |

*Primary Examiner*—Brian Casler
*Assistant Examiner*—Luanne P. Din
*Attorney, Agent, or Firm*—Morrison Law Firm

[57] ABSTRACT

A recording system technology for image data for stereoscopic viewing of electronic animation, that is inexpensive and simple, includes a left-eye image and a right-eye image for stereoscopic viewing that are both sized to take up one frame in display. An optical image conversion device is in front of a camera. The left-eye and right-eye images are arranged side by side, and the optical image conversion device optically reduces the width of the images by half to form two virtual images. The virtual images are projected to the camera so that they are distinctly arranged side by side within one frame of the display. The resulting image is recorded using, for example, CCD technology.

20 Claims, 1 Drawing Sheet

METHOD FOR RECORDING STEREOSCOPIC IMAGES AND DEVICE FOR THE SAME

BACKGROUND OF THE INVENTION

The present invention relates to a method for recording stereoscopic images and a device for the same. In particular, the present invention relates to a method and device for recording stereoscopic images that allows the inexpensive and simple recording of stereoscopic animation by using one camera.

Electronic animation games that use electronic displays such as video games and personal computer games have become popular. Animation of this type uses color in the images to provide a three-dimensional effect, similar to the effect of viewing television images. However, no processing is done to the images to provide a true three-dimensional effect, where images of animals or objects would appear to actually project out the screen.

Many types of these games have been created, including ones that allow the user to change the contents of the game itself. This has created a demand for stereoscopic images. For example, if a rocket is fired, the rocket should appear to fly from the display screen toward the viewer.

Conventionally, there has been something called stereoscopic photography. These photographs are taken with two cameras arranged side by side and the two images are superimposed during exposure. When the resulting photograph is viewed from two different angles, there is a sense of depth.

Using this principle, it is possible to use two cameras to obtain images that would be seen by the left and right eyes. The images would then be displayed on a single screen. However, in electronic animation, unlike static images, there are restrictions based on the display screen and the fact that the images change over time.

One currently known method involves using a video format where the screen is divided in half vertically and an image is given one half of the screen area. When the image is to be displayed, the image for the left eye and the image for the right eye are displayed in sequence over fixed intervals. A goggle having liquid crystal shutters is synchronized with the switching of the images so that the left and right images are kept distinct. The after-image on the retina of the viewer provides a three-dimensional effect.

This system requires the use of shutters, however, so that the flickering of the screen tends to result in eye fatigue. Also, since both eyes are viewing the same screen, the resolution is decreased. Furthermore, it is not possible to capture stereoscopic images with a single camera.

OBJECTS AND SUMMARY OF THE INVENTION

The object of the present invention is to overcome the problems of the prior art described above. The present invention is described below.

It is an object of the present invention to provide a method and a device so that stereoscopic animation can be easily recorded simply by interposing a optical image conversion device having a simple structure between the camera and the original image.

It is an object of the present invention to decrease the cost of recording stereoscopic images.

It is an object of the present invention to make stereoscopic viewing on a single display unit easy since all that is needed is the use of an inexpensive optical stereoscopic viewing mirror. Thus, there is no burden on the user.

It is an object of the present invention to allow the viewing, of animation recorded with this image recording method, that does not require elaborate devices or complex tools. By using a simple and inexpensive optical stereoscopic viewing mirror (goggles), the viewer can easily enjoy stereoscopic viewing.

It is an object of the present invention to provide an optical image conversion device that has a simple structure and can be compact. Thus, production costs are kept low. Also, since a standard camera can be used, it is possible to produce stereoscopic animation at very low cost.

In the method of the present invention, an optical adapter (optical image conversion device) is used to directly capture images with one camera. The optical adapter is a device that takes an original image, where an image for the left eye and an image for the right eye are arranged side by side, and optically reduces the width of the image.

The data for two or more frames having azimuth differences is projected onto a recording element such as CCD. Specifically, the optical device can be a combination of a cylindrical lens system (a single lens unit or a combination with a convergence correction lens) having different horizontal and vertical powers and either a prism system (a single lens unit or a plurality of lenses) or a mirror system.

Essentially the image projected onto the camera contains the left-eye image and the right-eye image reduced by half and arranged side by side within one frame. It would of course also be possible to project an image onto the camera where the widths of the images are reduced to a third and three frames are arranged side by side in one frame.

The optical device described above is not limited to applications involving animation, and can also be implemented for static images and cameras. Furthermore, the optical member can reduce the horizontal dimension of an image by using a combination of reflective mirrors, convex mirrors, concave mirrors and other lenses.

The present invention configured as described above operates in the following manner. In order to stereoscopically view electronic animation, for example, the image seen by the left eye and the image seen by the right eye must be different since the left and right eyes have different viewing angles. If the left-eye image and the right-eye image of an animation frame both take up one frame, then arranging the images side by side would result in the image filling one frame vertically and two frames horizontally. In directly sending the image from a camera, the optical image conversion device would be interposed between the camera and the original image. A cylinder lens system having different horizontal and vertical powers (in this case, a vertical power of 1 and a horizontal power of 0.5) is used to compress the original side-by-side image by one half so that the resulting image fits in one frame. This image is projected to the camera so that the left-eye image and the right-eye image are distinct and are arranged side by side within one frame. Thus, electronic animation recorded with this system would appear on the display with both the left-eye image and the right-eye image compressed horizontally by one half. When this is viewed with a stereoscopic viewing mirror (goggles), the left-eye image and the right-eye image are both enlarged horizontally by a factor of two. The left-eye image is viewed by the left eye and the right-eye image is viewed by the right eye, so the viewer perceives a stereoscopic image.

Briefly stated, a recording system technology for image data for stereoscopic viewing of electronic animation, that is inexpensive and simple, includes a left-eye image and a right-eye image for stereoscopic viewing that are both sized to take up one frame in a display. An optical image conversion device is in front of a camera. The left-eye and right-eye images are arranged side by side, and the optical image conversion device optically reduces the width of the images by half to form two virtual images. The virtual images are projected to the camera so that they are distinctly arranged side by side within one frame of the display. The resulting image is recorded using, for example, CCD technology.

According to an embodiment of the present invention, a method for recording stereoscopic animation using a single camera to electronically record from a single original image a plurality of animation data having different lateral viewing angles comprises the steps of disposing an optical image conversion device between a camera and an original image, the optical image conversion device effective to compress laterally the original image to form a laterally compressed image, and the optical image conversion device effective to project a plurality of the laterally compressed images onto the camera so that the laterally compressed images are distinctly disposed side by side, compressing the original image laterally with the optical image conversion device to form the laterally compressed image, arranging a plurality of the laterally compressed images in a single frame so that the laterally compressed images are distinctly disposed side by side, and capturing the side-by-side image by the camera.

According to an embodiment of the present invention, an optical image conversion device comprises an optical device interposed between a camera and an original image, a light entry hole and a light exit hole are formed on the front and rear of a case respectively of the optical device, means for laterally compressing the original image projected into the case through the light entry hole, means for arranging a plurality of the laterally compressed images in a single frame effective to dispose the images side-by-side, and means for projecting the side-by-side disposed images from the light exit hole to the camera.

According to an embodiment of the present invention, a method for recording stereoscopic animation using a single camera to electronically record from a single original image a plurality of animation data having different lateral viewing angles wherein an optical image conversion device is disposed between a camera and an original image, the optical image conversion device having the following properties: the original image is compressed laterally, and a plurality of laterally compressed virtual images is projected onto the camera so that the images are distinctly disposed side by side, the optical image conversion device compresses the original image laterally, and a plurality of laterally compressed virtual images is arranged in a single frame so that the virtual images are distinctly disposed side by side, and the side-by-side image is captured by the camera and formatted.

According to an embodiment of the present invention, an optical image conversion device comprises an optical device interposed between a single camera and an original image wherein: a light entry hole and a light exit hole are formed on the front and rear of a case respectively, a stereoscopic original image projected into the case through the light entry hole is laterally compressed, and a plurality of laterally compressed virtual images is arranged in a single frame so the virtual images are distinctly disposed side by side, and the side-by-side image is projected from the light exit hole to the camera.

The above, and other objects, features and advantages of the present invention will become apparent from the following description read in conjunction with the accompanying drawing, in which like reference numerals designate the same elements.

DETAILED DESCRIPTION OF THE PREFERRED EMBODIMENT

Figure 1:
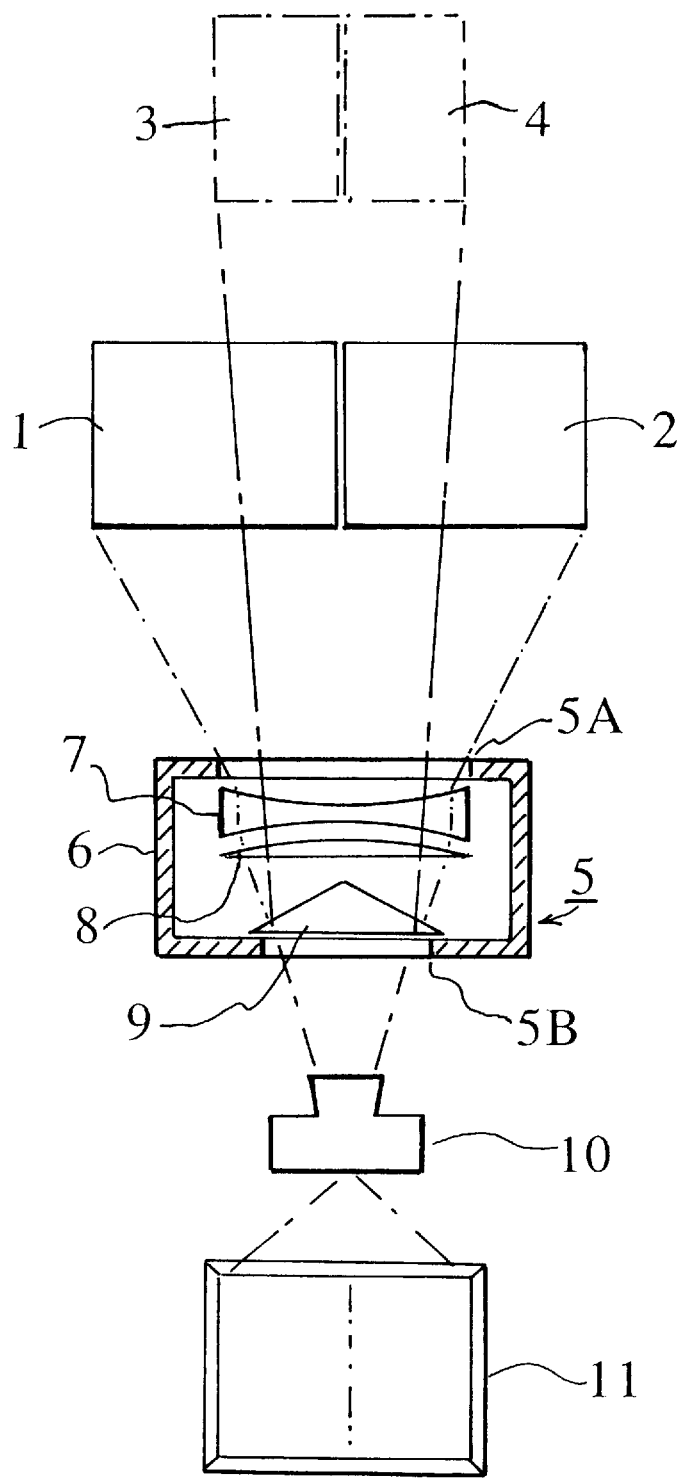
FIG. 1 is a plan drawing of the optical device for converting images and a schematic representation of the recording method.

Referring to the drawing, the following is a description of the embodiments of the present invention.

Referring to FIG. 1, there is shown a left-eye image 1, indicating how the left eye views an image on one frame of a display for viewing electronic animation, and a right-eye image 2, indicating how the right eye views an image on one frame of the display.

When left- and right-eye images 1, 2 are arranged side by side, the resulting image is twice as wide as the width of a single frame. This image enters through a light entry hole 5A of an optical image conversion device 5 and passes through optical members 7, 8, 9. When viewed from a light exit hole 5B, virtual images 3, 4 having widths compressed by one half are seen.

In optical image conversion device 5, an optical system member compressing just the width of an original image is disposed within a case 6. Optical system members 7, 8, 9 can be any optical system that compresses just the width of an original image.

For example, the optical system can be a cylinder lens system comprising: a cylinder lens 7 having different horizontal and vertical powers; and a correction lens 8 correcting the convergence of the image; and a prism 9 system arranging a left-eye image 1 (3) and right-eye image 2 (4) so that they can be seen separately side by side within a size corresponding to a single display frame.

Thus, by placing optical image conversion device 5 in front of a camera (CCD) 10, and capturing images with just one camera 10, it is possible to record image data where virtual images 3, 4 described above are arranged side by side in a single display frame. This data is then sent to display 11 and is displayed as a single image where virtual images 3, 4 are displayed side by side in the display frame.

If the image is for animation, it is possible to view an image where left-eye image 3 and right-eye image 4 are arranged side by side. This display frame can then be viewed with a stereoscopic viewing mirror that is not shown in the drawings. The image would be viewed so that the frame width is enlarged by a factor of two. The left eye would view left-eye image 3 and the right-eye would view right-eye image 4 so that the left- and right-eye images at the center of the eyes can be superimposed to produce a stereoscopic perception.

In this way, a single camera can be used to capture stereoscopic animation, and the display can be viewed easily using a simple and inexpensive optical stereoscopic viewing mirror.

Referring to FIG. 1, since the drawing is a schematic representation, the structure of optical image conversion device is drawn as a rough estimation. The optical image conversion device can be configured in various ways as long as a combination of optical systems that fulfills the objective is used. Of course, filters can be used as well.

The device can also be structured so that it can be directly mounted as an attachment to the front of the lens barrel of a camera. The device can be mounted indirectly in front of a camera via a support member with wheels that allow it to be moved vertically. The device can also be removably and adjustably mounted in front of a camera on a camera base.

In the case of installing the optical image conversion device of the present invention on a video projector, the parallel left and right images are magnified horizontally and visually accumulated up on a screen because of an action reverse to that action of recording the images. Polarized left and right filters are installed between the optical image conversion device and the video projector. The polarized left and right filters have different polarization directions from each other. Consequently, the projected left and right images on the screen also have different polarizations from each other. Hence, by using glasses that have left and right lenses with the corresponding polarization directions for the projected left and right images, viewers can enjoy stereoscopic viewing. Accordingly, the optical image conversion device of the present invention allows projection of stereoscopic images, viewable by polarized glasses, by using only one projector.

The present invention configured as described above has, the following advantages:

A. Stereoscopic animation can be easily recorded simply by interposing a optical image conversion device having a simple structure between the camera and the original image. The cost of recording images is decreased significantly. Furthermore, stereoscopic viewing on a single display unit is made easy since all that is needed is the use of an inexpensive optical stereoscopic viewing mirror. Thus, there is no burden on the user.

B. Viewing animation recorded with this image recording method does not require elaborate devices or complex tools. By using a simple and inexpensive optical stereoscopic viewing mirror (goggles), the viewer can easily enjoy stereoscopic viewing.

C. The optical image conversion device has a simple structure and can be compact. Thus, production costs are kept low. Also, since a standard camera can be used, it is possible to produce stereoscopic animation at very low cost.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for recording stereoscopic images comprising the steps of:

disposing an optical image conversion device between a single camera and a plurality of original images, each of said plurality of original images having a different horizontal parallax from a single object;

said camera having a single lens, said optical image conversion device having optical members effective to compress laterally said plurality of original images to form a plurality of laterally compressed images, and said optical image conversion device being effective to project said plurality of laterally compressed images onto said camera so that each of said laterally compressed images are distinctly disposed side by side;

compressing said plurality of original images laterally with said optical image conversion device to form said plurality of laterally compressed images;

arranging each of said plurality of laterally compressed images in a single frame so that said laterally compressed images are distinctly disposed side by side within a single frame;

projecting said plurality of laterally compressed images onto said camera; and capturing said side-by-side image by said camera.

2. A method for recording stereoscopic images according to claim 1 wherein said laterally compressed images are virtual images.

3. A method for recording stereoscopic images according to claim 1 wherein said camera formats said side-by-side image after said step of capturing.

4. A method for recording stereoscopic images according to claim 1 wherein said stereoscopic images are animation images.

5. An optical image conversion device comprising:

an optical device interposed between a single camera and a plurality of original images, each of said plurality of original images having a different horizontal parallax from a single object;

said camera having a single lens;

a light entry hole and a light exit hole formed on the front and rear of a case respectively of said optical device, each of said plurality of original images being projected through said light entry hole into said case;

means for laterally compressing each of said plurality of original images projected into said case through said light entry hole;

means for arranging each of said plurality of laterally compressed images in a single frame side-by-side to form a side-by-side disposed image; and means for projecting said side-by-side disposed image from said light exit hole to said single camera.

6. An optical image conversion device according to claim 5 wherein said laterally compressed images are virtual images.

7. An optical image conversion device according to claim 5 wherein said original image is stereoscopic.

8. A method for recording stereoscopic animation using a single camera to electronically record from a single original image a plurality of animation data having different lateral viewing angles wherein:

an optical image conversion device is disposed between a camera and a plurality of original images, each of said plurality of original images having a different horizontal parallax from a single object;

said optical image conversion device having the following properties; said plurality of original images are compressed laterally; and a plurality of laterally compressed virtual images are projected onto said camera so that each of said images are distinctly disposed side by side;

said optical image conversion device compresses said plurality of original images laterally to form a plurality of laterally compressed virtual images;

said plurality of laterally compressed virtual images are arranged in a single frame so that each of said virtual images are distinctly disposed side by side; and said side by side image is captured by said camera and formatted.

9. An optical image conversion device comprising:

an optical device interposed between a single camera and a plurality of original images, each of said plurality of original images having a different horizontal parallax from a single object, said single camera having a single lens;

a light entry hole and a light exit hole formed on the front and rear of a case of said optical device respectively;

means for laterally compressing each of said plurality of original images projected into said case through said light entry hole, using optical members, to form a plurality of laterally compressed virtual images;

means for arranging said plurality of laterally compressed virtual images in a single frame so that each of said virtual images are distinctly disposed side by side to form a side-by-side image; and means for projecting said side-by-side image from said light exit hole to said single camera.

10. A method for recording stereoscopic images according to claim 1, wherein said optical members include a convex cylindrical lens and a concave cylindrical lens.

11. A method for recording stereoscopic images according to claim 1, wherein said optical image conversion device includes one of a mirror and a prism.

12. A method for recording stereoscopic images according to claim 10, wherein said optical image conversion device includes one of a mirror and a prism.

13. An optical image conversion device according to claim 5, wherein said means for laterally compressing includes optical elements.

14. An optical image conversion device according to claim 13, wherein said optical elements include a cylindrical lens.

15. An optical image conversion device according to claim 5, wherein said means for arranging including one of a mirror and a prism.

16. An optical image conversion device according to claim 14, wherein said means for arranging including one of a mirror and a prism.

17. An optical image conversion device according to claim 9, wherein said optical members include one of a prism and a mirror.

18. An optical image conversion device according to claim 5, wherein:

said means for laterally compressing is a concavo-convex cylindrical lens, disposed inside said case; and said means for arranging is a prism, disposed inside said case, said prism having a number of sides equal to (N+1), where N equals a number of said plurality of original images.

19. An optical image conversion device according to claim 5, wherein:

said means for laterally compressing is a concavo-convex cylindrical lens, disposed inside said case; and said means for arranging is a flat mirror disposed inside said case.

20. An optical image conversion device according to claim 18, wherein said concavo-convex lens is disposed to be nearer said object than said prism.

* * * * *